United States Patent [19]

Fiedler

[11] 4,318,185
[45] Mar. 2, 1982

[54] PROGRAMMABLE SWITCHING DEVICE

[76] Inventor: Helmut Fiedler, Eichbaumstrasse 33, 8011 Siegertsbrunn, Fed. Rep. of Germany

[21] Appl. No.: 85,783

[22] Filed: Oct. 17, 1979

[30] Foreign Application Priority Data

Oct. 26, 1978 [DE] Fed. Rep. of Germany ....... 2846686

[51] Int. Cl.³ .......................... G06F 15/46; H04Q 9/00
[52] U.S. Cl. ................................. 364/900; 340/825.22
[58] Field of Search ......................... 364/900 MS File; 235/92 ME; 328/75; 340/147 P, 166 R

[56] References Cited

U.S. PATENT DOCUMENTS

| | | | |
|---|---|---|---|
| 3,546,684 | 12/1970 | Maxwell et al. | 364/900 |
| 3,944,980 | 3/1976 | Riedmayr | 235/92 ME X |
| 3,950,736 | 4/1976 | Dix et al. | 364/900 |
| 4,140,872 | 2/1979 | Egey | 340/147 P X |

OTHER PUBLICATIONS

Bachner et al., "Short-Haul Transmission System of Teleprinter 1000", Siemens-Zeitschrift 50 (1976), Beiheft Fernschreiber 1000, pp. 30-33.

*Primary Examiner*—Gareth D. Shaw
*Assistant Examiner*—Thomas M. Heckler
*Attorney, Agent, or Firm*—Hill, Van Santen, Steadman, Chiara & Simpson

[57] ABSTRACT

A programmable switching device is disclosed for controlling of the time functional sequence of functions in various devices. The switching device associates input signals to output signals with the use of a switching network which is formed of at least one programmable matrix of a state register and at least one pulse generator. An input matrix is preconnected to the switching network and produces control signals which are fed to the switching network from the input signals in dependence upon priority signals which are associated to different priority levels. The priority signals which are produced in a priority generator are fed both to the input matrix as well as to the switching network. A processing of the input signals is therefore attained which corresponds to a time division multiplex operation. The switching network is preferably formed out of a main matrix and an output matrix.

7 Claims, 5 Drawing Figures

PROGRAMMABLE SWITCHING DEVICE

BACKGROUND OF THE INVENTION

The invention concerns a programmable switching device for the controlling of the timing sequence of functions in devices. At the inputs of the programmable device are input signals which cause the carrying out the functions and which releases output signals which are associated with individual steps of the functions which are to be carried out at set times. A pulse generator, a combinational circuit provided with at least one programmable matrix, and a state register which is connected thereto carry out the functions.

In communication engineering and electronic data processing devices, switching devices are provided which control the time sequence of functions in the devices. These switching devices are customarily constructed of a plurality of binary switching elements and storage elements. These switching elements and storage elements are put together by the designer of a switching device of this sort. The kind and the number of the switching elements and storage elements, as well as their arrangement in the switching device in the case of given functions to be carried out, are set according to the discretion of the designer. The internal logic functions of the switching device are first completely defined in this processing step and are documented in the form of a logic plan. This process has the result that the structure of the switching device particularly in the case of irregular networks, is nonuniform and is often very complicated topographically. With this, the representation is vague and function changes can only be carried out with great difficulty. Further, the specification of the switching device must proceed at the level of the switching and storage elements, because the logic functions are completely defined only at this level.

From German AS No. 2,657,404 incorporated herein by reference, a switching device is known where the structure of the switching and storage elements is predefined, so that a functional sequence diagram can be unambiguously presented which represents a random function. This switching device contains a plurality of control units which are provided in each case with a storing input level and which produce control signals with the use of matrices. These control signals on the one hand represent the output signals and on the other hand together with the input signals are fed to the input stages. In the case of this known switching device, the control units are arranged either hierarchically or in parallel. Each control unit controls the carrying out of at least one function.

From the publication "Short Haul Transmission System of the Teletypewriter 1000", Siemens Magazine 50 (1976), supplement "Teletypewriter 1000", pages 30 through 33, a programmable switching device is known which contains a switching device which is formed from two programmable matrices, a main matrix and an output matrix, and to which device input signals are fed. The output matrix produces the output signals, while the main matrix is connected with a state register and a pulse generator. In the state register, operating states are stored at points in time which are determined by the pulse generator. The operating states are determined in dependence upon the input signals and preceding operating states in the main matrix, whereas the output matrix produces the output signals in dependence upon the input signals and the preceding operating states.

In the case of both known switching devices, the input signals are fed directly to the switching device or respectively, to the matrices, so that, for each input signal, one column is provided in the corresponding matrix. The known switching devices therefore require relatively involved matrices, in the case of which the redundancy contained in the input signals is not taken into consideration.

SUMMARY OF THE INVENTION

The invention is thus based upon the problem of providing a programmable switching device in the case of which the switching network, or respectively, the matrices, have a low cost.

According to the invention, a switching device has at least one input matrix which produces control signals which are fed to the switching network in dependence upon the input signals and in dependence upon priority signals which are associated with different priority levels. By means of a functional sequence control which is provided with a priority generator, the priority signals are produced and released to the input matrix and to the switching network.

By means of the use of an input matrix, the number of the input signals is reduced. Thus, one proceeds from the fact that not all possible combinations of the input signals are relevant. The input matrix functions on the one hand as a logic switching element, and on the other hand, as a time sequence multiplexer. A control signal at its output can be associated with another input signal or switching result in each priority level. The multiplexing of the input signals, or respectively, of the switching results, proceeds by means of the priority signals. In a corresponding manner, the demultiplexing in the switching network proceeds with the use of the priority signals.

The switching device according to the invention has the advantage that it can be produced economically. It is suited for construction as an integrated circuit, in particular as an MOS circuit. The switching device can be programmed in a simpler manner and can be employed in many ways. It is suited for example as an input for a microprocessor when critical real time functional sequences require a signal processing with a high scanning rate.

In order to attain a multi-faceted employment of the programmable switching device, it is advantageous if at least a part of the output signals which are produced by the switching network are at the input matrix as return signals.

When the switching network of a programmable switching device contains a main matrix which is connected with the state register and the pulse generators, and which contains an output matrix which produces the output signals and which is connected with the state register and the inputs of the switching device, it is advantageous if the control signals and the priority signals are at the main matrix.

When a plurality of pulse generators are provided, it is practical that one of the priority signals is fed to each of the pulse generators. The programming of the switching device is greatly simplified by this, since then, in each priority stage, only one pulse generator in each case is activated.

For multiple applications of the programmable switching device, it is practical if the priority generator contains a programmable matrix with which the number of the priority stages and their sequence can be determined. It is also practical if the priority generator can be influenced by means of an inhibiting signal.

For multiple uses of the programmable switching device, it is further practical if the input matrix is designed as a programmable matrix. It is particularly advantageous if the input matrix is designed as a switch through matrix by means of which at least a part of the input signals which are supplied to the lines can be connected through in dependence upon the priority signals and/or the return signals as control signals. An independence from the polarity of the input signals and an increase of the switching possibilities is attained in that the signals can be selectively fed inverted or non-inverted to at least a portion of the lines of the input matrix, the main matrix and/or the output matrix.

In order to keep the number of connections between the output matrix and the input matrix as low as possible, it is favorable when the return signals are transmitted in coded fashion to the input matrix and the input matrix decodes the return signals.

DESCRIPTION OF THE PREFERRED EMBODIMENTS

Figure 1:
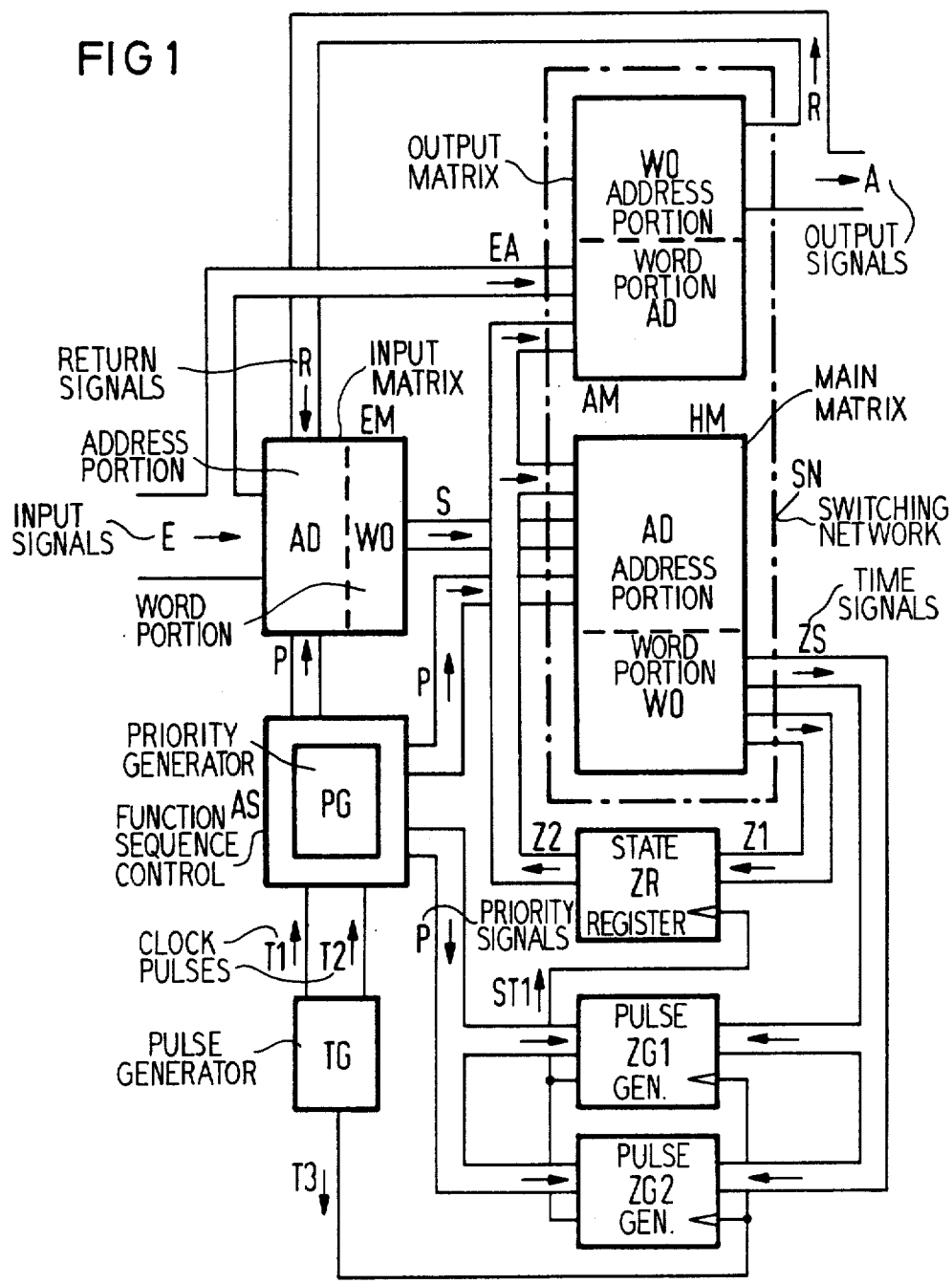
FIG. 1 shows a block diagram of a programmable switching device.

The programmable switching device which is represented in FIG. 1 is suited for the realization of digital control, in particular when, in the case of a multiplicity of input and output signals, only relatively few stored states are necessary for the combination of these signals and they are frequently formed with a large range of variation. The switching device has, for example, 17 inputs, at which input signals E are present. Also, 16 outputs are provided at which output signals A are transmitted. The switching device contains a state register ZR in which up to 64 operating states can be stored as well as two pulse generators ZG1 and ZG2 which are independent of one another. The program of the switching device is stored on the one hand in a switching network SN and on the other hand in an input matrix EM. The switching network SN is constructed, for example, out of a main matrix HM and an output matrix AM. The main matrix HM, as well as also the output matrix AM and the input matrix EM, are provided with programmable address and word portions AD, or respectively, WO.

The switching of the operating states, which are stored in the state register ZR with the input signals E, are carried out in a time division multiplex process and can be distributed to several priority levels. The priority levels are determined by priority signals P which are produced in a sequence control AS. The sequence control AS for this purpose contains a priority generator PG, which, for example, also is designed as a programmable matrix. A pulse generator TG generates opposite phase clock pulses T1 and T2 and clock pulse T3 for the further switching of the pulse generators ZG1 and ZG2.

To make possible the production or interpreting of time intervals, the pulse generators ZG1 and ZG2 are provided in the switching device. With this, in the state register ZR, only those operating states are stored which are necessary for the logical—but not time oriented—association of the input signals E to the output signals A. The state register ZR, for example, contains six flip-flops in which the operating states are stored in double coded form. The new operating state in each case is represented by state signals which are released by the switching network SN and are stored in the state register ZR by means of signals ST1 which are released by the pulse generators ZG1 or ZG2. The current operating state in each case is represented by state signals Z2 which are released by the state register ZR, these signals being fed to the switching network SN.

From the state signals Z2 and the signals lying at its remaining inputs, the switching network SN on the one hand forms the output signals A, the return signals R, the state signals which are associated with the new operating state, and time signals ZS which determine the timing for the pulse generators ZG1 and ZG2.

The two pulse generators ZG1 and ZG2 are built the same. Their memories are binary divider chains. When a time request is applied by means of the time signals ZS, the clock pulses T3 are counted and the count of the counter is compared with the time request. If the time request coincides with a count of the counter, then the signal ST1 is released which indicates that the requested time has elapsed. With the signal ST1, the new operating state is then stored into the state register ZR.

The main matrix HM, the output matrix AM and the input matrix EM are designed as known PLAs (programmable logic arrays). In the case of matrices of this sort, an OR switching of AND switchings are carried out and each decision table which is represented in binary form can be realized with it, if its number of inputs, lines and outputs are accommodated to the decision table. One calls the first portion of the matrix in which the AND switchings of the input signals are carried out, the address portion AD of the matrix, and one calls the second portion, in which the OR switchings of the AND switchings are formed, the word portion WO of the matrix.

The partitioning of the switching network SN into the main matrix HM and the output matrix AM makes possible a favorable utilization of the matrices by means of multi-addressing and composite word formation. Input signals EA, which represent a part of the input signals E, and the state signals Z2 are fed to the address portion AD of the output matrix AM. The word portion WO of the output matrix AM produces the output signals A and return signals R, which can represent a part of the output signals A. The return signals R are fed to the input matrix EM. The state signals Z2, control signals S which are released by the input matrix EM, and the priority signals P are fed to the address portion AD of the main matrix HM. The word portion WO of the main matrix HM produces the state signals Z1 and the time signals ZS.

The switching device couples the operating states with the input signals E in the time division multiplex process. This has the advantage that the expense in the word portion of the main matrix HM is reduced by means of alternating association of the pulse generators ZG1 and ZG2 to the interrogation times in the main matrix HM. Further, the expense in the addressing portion of the main matrix HM is reduced by mapping of the input signals E onto the control signals S. The input matrix EM functions as a concentrator and eliminates the redundancy which is present in the input signals E. Therefore, one begins with the fact that not all possible combinations of the input signals E are meaningful or necessary. According to the interrogation time in the time division multiplex system, the control signals S correspond to another input situation. In the simplest case, a control signal S consecutively represents in each case one other input signal E. The processing regions in the time division multiplex system are determined by means of the priority signals P, which determine the individual processing times and synchronize the input matrix EM, the main matrix HM, and the pulse generators ZG1 and ZG2. The mapping function of the input matrix EM can also be influenced by the operating states. This function is taken over by the return coupling from the output matrix AM to the input matrix EM by means of the return signals R. The return signals R, for example, are produced in a three-bit wide data channel coded as "internal input signals", and are decoded in the input matrix EM.

Figure 2:
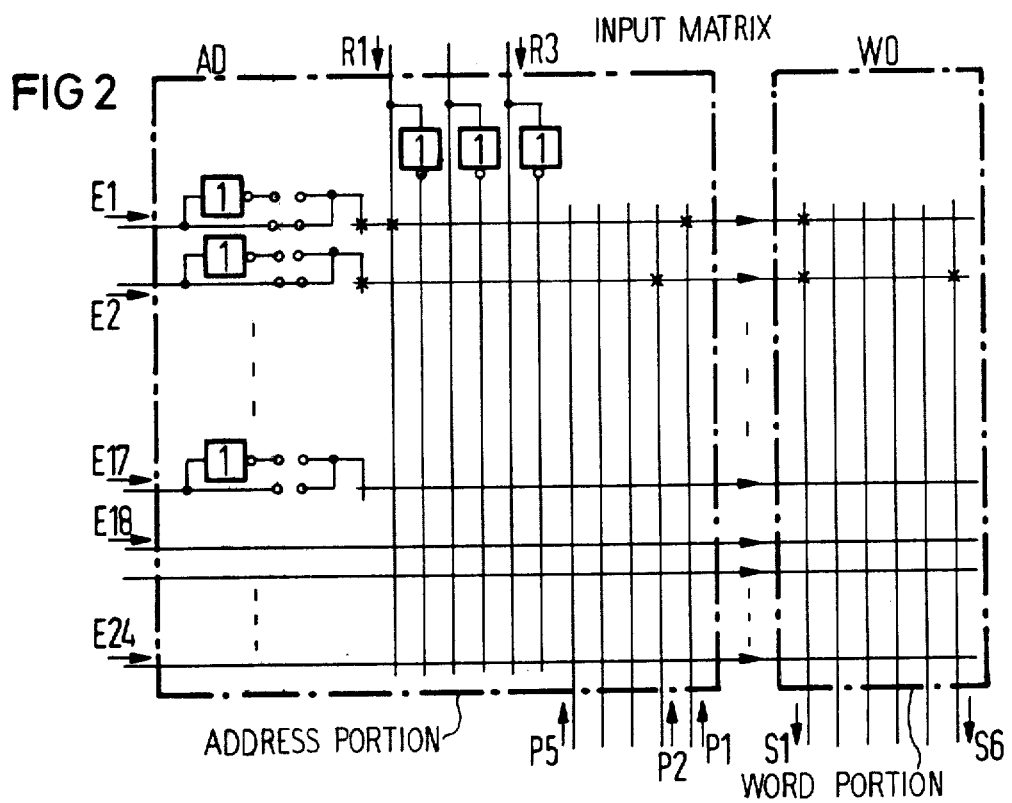
FIG. 2 shows a diagram of an input matrix.

The input matrix EM, which is represented in FIG. 2, associates the control signals S to the input signals E, in dependence upon the return signals R and the priority signals P. The input matrix EM is, for example, laid out for 17 input signals E1 through E17 and 6 control signals S1 through S6. The input matrix EM is designed as a switch-through (connect through) matrix in PLA structure. One line is associated with each input signal E. The input signals E can become active in the line if corresponding coupling transistors, which are represented by crosses, are programmed. The input signals E1 through E17 can be fed to the lines in inverted or non-inverted fashion via inverters.

The priority signals P1 through P5 give five different priority levels in a 1-out of 5 code, that is, in each case only one of the priority signals P1 through P5 can have the value 1 and the others in each case have the value 0.

The return signals R1 through R3 serve on the one hand for production of the "internal input signals" E17 through E24 or for the switching through of the input signals E1 through E17. For each value of the return signals R1 through R3, a column of the matrix is available.

If, for example, coupling transistors are provided at the places represented with crosses in FIG. 2, and if the input signals E1 and E2 are fed via the corresponding bridges of the lines to the matrix, then an addressing signal is produced in the address portion AD in the first line, when the input signal E1, the return signal R1, and the priority signal P1 have the value 1. In a corresponding manner, an addressing signal is produced in the second line when the input signal E2 has the value 0 and the priority signal P2 has the value 1. In the word portion WO, a control signal S1 is produced in both priority levels and besides this, in the second priority level, a control signal S6 is produced.

Figure 3:
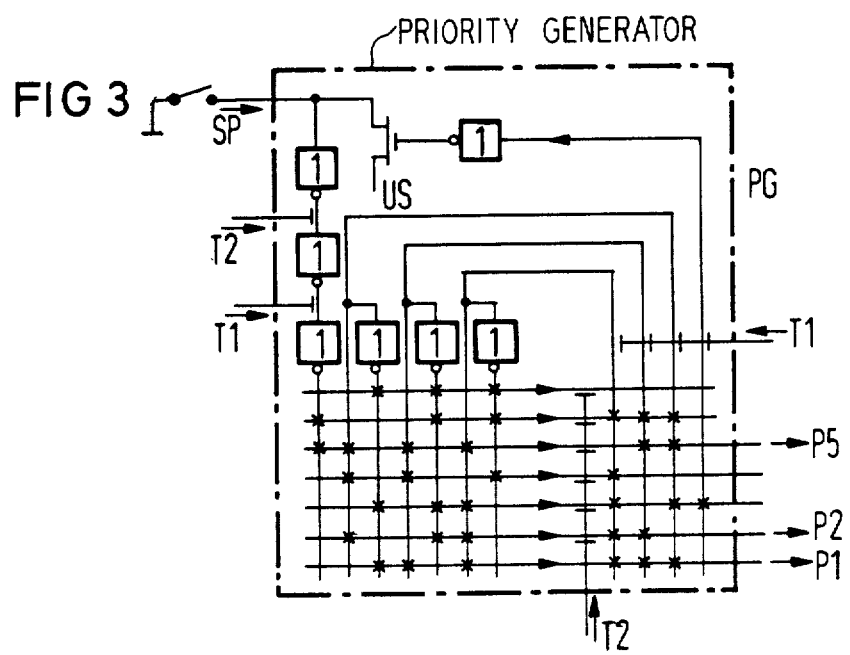
FIG. 3 shows a diagram of a function sequence control which contains priority generator which is provided for sequence controlling.

In FIG. 3, the priority generator PG is represented by the sequence control AS. The function of the priority generator PG corresponds to that of a back-coupled shift register in which the value 1 circulates. In the case of the embodiment example which is represented, the priority generator PG is realized by means of a programmable matrix. The opposite phase clock pulses T1 and T2 are fed to the priority generator PG. The timing of the priority generator PG can be influenced by an inhibiting signal SP. The priority generator PG which is represented is designed for production of up to five priority signals P1 through P5, which are associated to five priority levels, whereby the priority signal with the highest number is always produced first.

When, for example, the priority signal P2 is just being produced with the next clock pulse T1 the output signals of the word portion are directed back to the addressing portion and the last line in the addressing portion of the matrix produces an addressing signal. This is switched through to the word portion with the next following clock pulse T2 and the priority signal P1 is produced. Following this, in a similar manner in a new cycle again the priority signals P5 through P1 are produced. If the inhibiting signal SP assumes the value 1, then the priority generator PG is stopped at the end of a cycle. It remains in a waiting position there until the inhibiting signal SP again assumes the value 0. The inhibiting signal SP is used, for example, when several programmable switching devices function together. In this case, the priority generators PG can be released and inhibited in the individual switching devices in order by means of the inhibiting signal SP. Further details of the switching device will be specified in the following with the use of a programming example.

Figure 4:
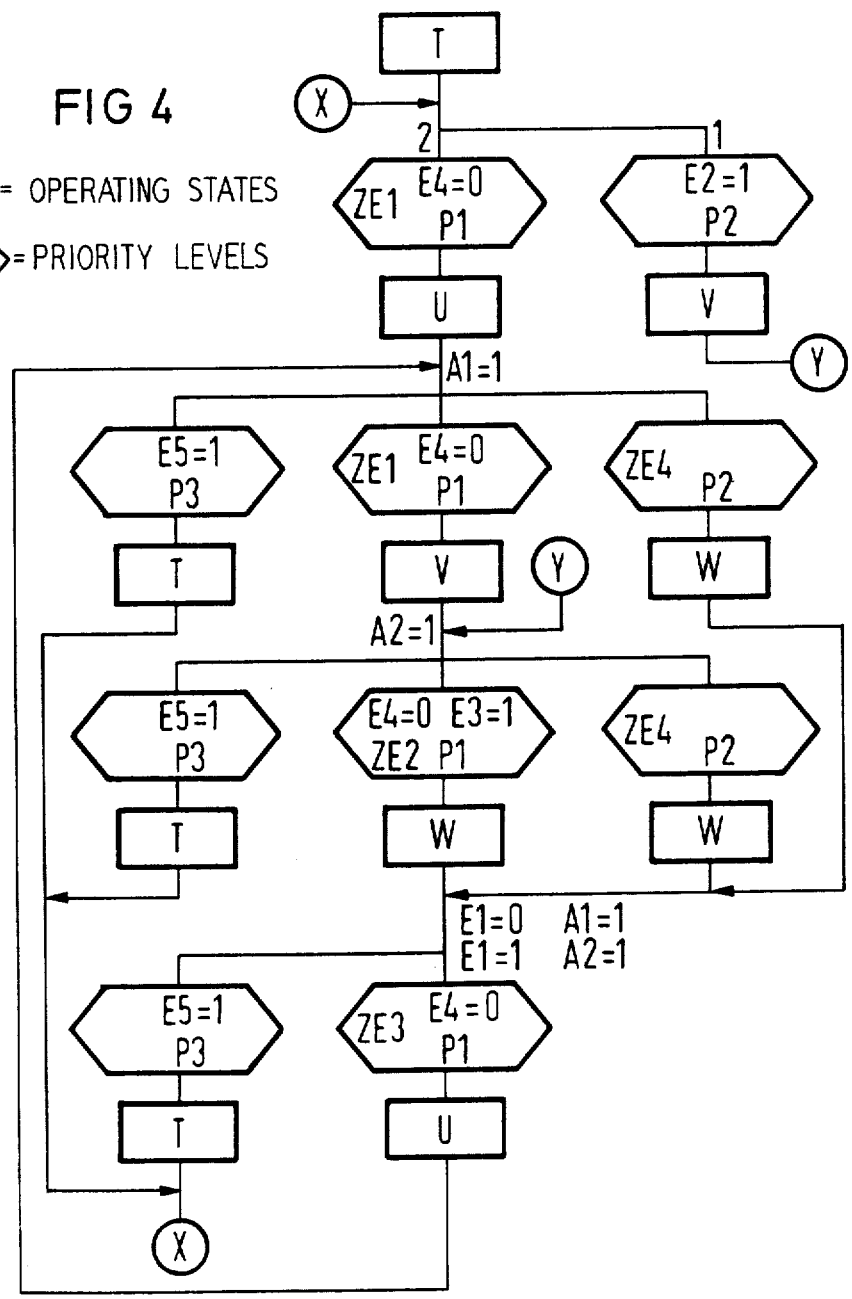
FIG. 4 shows a flow diagram of functions which are to be carried out by the switching device.

In the case of the operating state diagram which is represented in FIG. 4, the individual steps in the functional sequence of several functions are represented. In the rectangular boxes, operating states T, U, V and W are represented. A sequence of operating states consist of numbered paths with a start-operating state, a transitional condition represented in a 6 sided box and a target operating state. A transitional condition is active when all associated criteria are fulfilled where applicable, during the cited time. Usually several target operating states are associated to a start-operating state, the transitional conditions of which target operating states as a rule are not mutually exclusive logically. Thus, they can be fulfilled at the same time and the further functional sequence does not correspond to the desired function. In the present flow diagrams, this case does not occur because the sequence of the decision boxes necessarily produces priorities for the paths. Thus, a path branching is always unambiguous. This representation form which refers to the realization simulates the necessity of a time graduated processing. On the other hand, in the operating state diagram, the logical decisions of a path branching step into the foreground. An unambiguous functional sequence is attained in that the transitional conditions of the paths receive priority states which are determined by means of the priority signals P, which states nevertheless only become active when the logic and timing conditions are fulfilled simultaneously. In the operating state diagram, simultaneous functional sequences can also be represented which corresponds to multiprocessing.

Figure 5:
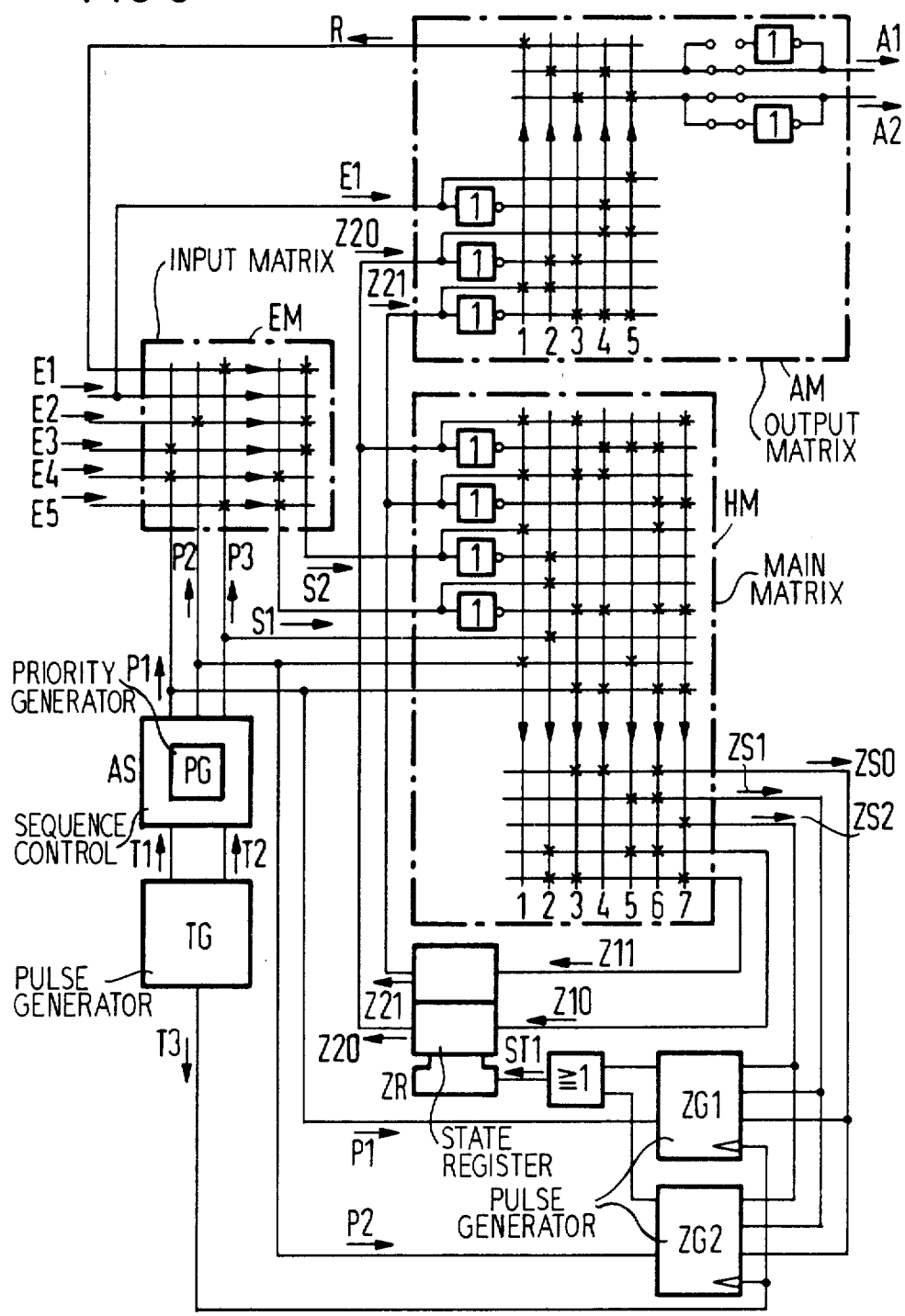
FIG. 5 shows a diagram of the programmable switching device which is programmed for carrying out the functions represented in FIG. 4.

In the case of the control unit which is suited for the execution of the programming example in FIG. 5, the following associations are assumed between the operating states and the state signals Z1 and Z2, between the priority levels and priority signals P, and between the times ZE1 through ZE4 and the time signals ZS:

| Operating States | | | |
|---|---|---|---|
| Z11, Z21 | Z10, Z20 | Z11, Z21 | Z10, Z20 |

-continued

| | | | | | |
|---|---|---|---|---|---|
| T | 1 | 1 | V | 0 | 0 |
| U | 1 | 0 | W | 0 | 1 |

Priority Levels

| | P3 | P2 | P1 |
|---|---|---|---|
| 1 | 0 | 0 | 1 |
| 2 | 0 | 1 | 0 |
| 3 | 1 | 0 | 0 |

Times

| | ZS2 | ZS1 | ZS0 |
|---|---|---|---|
| ZE1 | 0 | 0 | 1 |
| ZE2 | 0 | 1 | 1 |
| ZE3 | 1 | 0 | 0 |
| ZE4 | 0 | 1 | 0 |

First, it is assumed that the operating state T is stored in the state register ZR. The state signals Z21 and Z20 thus have the value 1. In the output matrix AM, thus the column 1 is activated and a return signal R is produced. The columns 1 through 3 are prepared for an activation in the main matrix HM. When the priority signal P3 is produced via the input matrix EM, the input signal E5 and the return signal, as signal S1, or respectively, S2, are connected through to the main matrix HM. Since only the priority signal P3 has the value 1, only column 2 of the main matrix HM can be activated. Since nevertheless the control signal S2 has the value 1, the column 2 is inhibited. Thus at the output of the main matrix HM, no signals are released. Since no time requests occur, also no signal ST1 is produced and the stored operating state T remains unchanged.

If the priority signal P2 occurs, then the path 1 is followed in the operating state diagram. The input signal E2 is fed to the main matrix HM as control signal S2 and thus column 1 is prepared. Since the priority signal P2 is also active in the column 1, the column 1 releases an addressing signal to the word portion of the main matrix HM. Since this column in the word portion is connected with no line, the state signals Z11 and Z10 have the value 0, which corresponds to the new operating state V. Besides this, the time signals ZS2 through ZS0 have the values 0, so that no time requests occur, and immediately the operating state V is stored into the state register ZR by means of the signal ST1. The signal ST1 is produced in the pulse generator ZG2, which is released by means of the priority signal P2.

If the priority signal P1 occurs, then in the operating state diagram, the path 2 can be followed. In the case that the input signal E4 has the binary value 0, the control signal S1 has the binary value 0. With this, the column 3 of the main matrix HM is prepared. Since the priority signal P1 is also fed to this column, an addressing signal is produced. The state signal Z11 which is produced in the word portion has the value 1, whereas the state signal Z10 has the value 0. These values are associated with the new operating state U. The time signal Z20 has the value 1, whereas the time signals ZS1 and ZS2 have the value 0. These values are associated to the time ZE1. When the time ZE1 has elapsed, a signal ST1 is produced which stores the state U in the state register ZR.

In the case that the timing functional sequence of the functions to be carried out is continued with the operating state U, the state signals Z21 and Z20 have the values 1, or respectively, 0. Thus, in the output matrix AM, the column 2 is activated and an output signal A1 is produced. The output signals A1 and A2 can be released selectively in inverted or non-inverted fashion with the use of an inverter in each case. In the main matrix HM, the columns 2, 4 and 5 are prepared. With the appearance of the priority signal P3, again the return signal R and the input signal E5 are switched through as control signals S2, or respectively, S1. Since the return signal R has the value 0, the column 2 in the main matrix HM is activated in the case that the input signal E5 has the value 1. The state signals Z11 and Z10 then have the value 1, which corresponds to the operating state T. The time signals ZS2 through ZS0 have the value 0, so that the new operating state T is immediately stored into the state register ZR.

With the appearance of the priority signal P2, the column 5 in the main matrix HM is activated. The state signals Z11, or respectively, Z10, assume the values 0, or respectively, 1, which are associated to the operating state W. The time signals ZS2, ZS1 and ZS0 associated with time ZE4 simultaneously assume the values 0, 1, or 0, respectively. After the elapsing of the time ZE4, the new operating state W is stored in the state register ZR.

If the priority signal P1 appears, the input signals E3, or respectively, E4 are connected through as control signals S2, or respectively, S1. While the control signal S2 remains ineffective, the control signal S1 activates the column 4 in the main matrix HM in the case that it has the value 0. The state signals Z11 and Z10 have the values 0, which are associated to the new operating state V. The time signals ZS2, ZS1 and ZS0 associated with time ZE1 have the value 0, 0, or 1, respectively. After elapsing of the time ZE1, the new operating state V is stored in the state register ZR.

The further steps which are represented in the operating state diagram are carried out in similar manner. Regarding this, it is to be stressed in particular that in the case where one begins with the operating state W, the columns 4 and 5 are prepared in the output matrix AM. If the input signal E1 has the binary value 1, then the output matrix AM releases the output signal A2. If the input signal E1 has the binary value 0, then the output matrix AM releases the output signal A1. Thus in this case a coupling of the input signals with the state signals proceeds in the output matrix AM.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A programmable switching device for controlling a time related sequence of functions in devices, each function having individual steps associated therewith, comprising:
   a plurality of inputs;
   input signals at the inputs for initiating a carrying out of the functions;
   pulse generator means for producing timing signals;
   a switching network means having at least one programmable matrix for generating output signals associated with the individual steps of the functions to be carried out on the devices at times which are determined by the timing signals of said pulse generator means and for producing operating state signals corresponding to the operating states necessary for logical association of the input signals to the output signals;

a state register means connected to the pulse generator means and the switching network means for storing said operating states;

a progammable input matrix means connected to said plurality of inputs;

a functional sequence controlling means having a priority generator for producing priority signals associated with different priority levels and for providing them to the input matrix means and to the switching network means;

the input matrix means producing control signals which are fed to the switching network means in dependence upon said input signals and in dependence upon said priority signals associated with different priority levels;

a portion of the output signals being fed back as return signals to the input matrix means; and the input matrix means being designed as a switch through matrix for feeding at least a portion of the input signals or said return signals through to the switching network means in dependence upon the priority signals.

2. A programmable switching device according to claim 1 wherein the switching network means has a main matrix connected with the state register means and pulse generator means;

an output matrix means connected with the state register means and the inputs of the switching device for producing the output signals; and the control signals and said priority signals being fed to the main matrix.

3. A programmable switching device according to claim 1 wherein one of the priority signals is fed to said pulse generator means.

4. A programmable switching device according to claim 1 wherein the priority generator has a programmable matrix means for determining the number of priority levels and their sequence.

5. A programmable switching device according to claim 1 wherein an inhibiting signal means is provided for blocking the priority generator.

6. A programmable switching device according to claim 1 wherein means are provided in the input matrix means for selectively inverting or non-inverting the input signals at at least a portion of the inputs.

7. A programmable switching device according to claim 1 wherein the return signals are transmitted in coded fashion to the input matrix means and the input matrix means decodes the return signals.

* * * * *